INVENTORS
EDMUND HEARTSTEDT &
NEIL MARSHALL
BY
Hamilton & Cook
ATTORNEYS

INVENTORS
EDMUND HEARTSTEDT &
NEIL MARSHALL
BY Hamilton & Cook
ATTORNEYS

INVENTORS
EDMUND HEARTSTEDT &
NEIL MARSHALL
BY Hamilton & Cook
ATTORNEYS

INVENTORS
EDMUND HEARTSTEDT &
BY    NEIL MARSHALL

Hamilton & Cook

ATTORNEYS

Aug. 12, 1969  E. HEARTSTEDT ET AL  3,460,566
MULTI-WAY FLOW CONTROL VALVE
Filed July 10, 1967  8 Sheets-Sheet 8
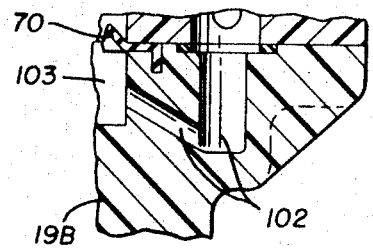
FIG. 12
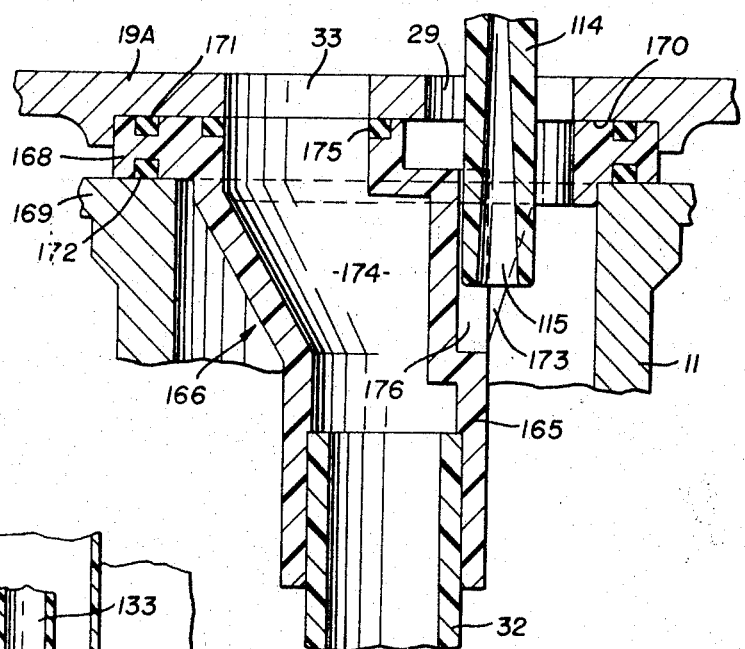
FIG. 13
FIG. 14
INVENTORS
EDMUND HEARTSTEDT &
NEIL MARSHALL
BY Hamilton & Cook
ATTORNEYS

United States Patent Office

3,460,566
Patented Aug. 12, 1969

3,460,566
MULTI-WAY FLOW CONTROL VALVE
Edmund Heartstedt and Neil Marshall, Ashland, Ohio, assignors to The F. E. Myers & Bro. Co., Ashland, Ohio, a corporation of Ohio
Filed July 10, 1967, Ser. No. 652,326
Int. Cl. F16k *11/22;* B01d *29/38;* C02b *1/18*
U.S. Cl. 137—571                                                20 Claims

ABSTRACT OF THE DISCLOSURE

A control in the nature of a multi-way valve for directing fluid flow which, in its basic form, has particular usefulness as a control for a three cycle filtering unit, and, in its more complete form, for a five cycle water softening unit. Principally, the control directs fluid flow from the supply inlet selectively to the top or bottom of a conditioning tank and, from the conditioning tank selectively to a service outlet or drain. Within the housing of the control are two double acting poppet valves. One poppet valve is movable between two positions selectively to direct the fluid either from the inlet to a feed chamber which communicates with the top of the conditioning tank or to an outlet port. The second of said double acting poppet valves is also movable between two positions, but this valve selectively directs the fluid from a distributing chamber, which communicates with the bottom of the conditioning tank, to the outlet port or from the inlet to the outlet port. Pressure responsive means are provided for each double acting poppet valve to move them between their two positions. In addition, two single acting poppet valves are provided within the housing. The single acting poppet valves are each movable between an open and a closed position; one of the single acting poppet valves selectively permits flow from the distributing chamber to a drain, and the other single acting poppet valve selectively permits flow from the feed chamber to the drain. Pressure responsive means are also provided for moving each single acting poppet between its open and closed positions. For use as a softening control, a brining reservoir is connected to a venturi within the housing for drawing brine out of the reservoir and dispensing it into the top of the conditioning tank. A two-way flow control valve is provided in the passage between the reservoir and the venturi. The control valve is movable between a "closed" position and and an "open flow" position with respect to the brine flowing from the reservoir to the venturi and provides either a "closed" position or a "metering" position with respect to water flowing from the housing to the reservoir.

Background of the invention

Filtering and/or conditioning of water provides many advantages. Conditioned water—i.e., water which has been filtered, softened and/or relieved of certain other undesirable minerals—adds much in the way of comfort and convenience to the user as well as considerable preventive maintenance. As examples of comfort and convenience, one finds that soap lathers more freely, shaving is effortless, glasses and dishware glisten without spots and bath tub rings are also virtually eliminated. With respect to preventive maintenance, water lines, heating tanks and/or boilers are free from scale build-up.

The "down flow" type conditioners have proven most satisfactory. In such a conditioner the hard water flows down through the conditioning tank during service. The conditioning tank contains a bed of granular softening mineral and an underbedding such as gravel. As the water flows through the tank any sediment which may be present is filtered out and hardness is removed by an "ion exchange" (undesirable metallic ions are substituted for sodium ions in the mineral bed). Thus, the water flowing out of the bottom of the conditioning tank into the service line is softened.

From time to time the mineral bed must be regenerated. It has been found that the most desirable method of regeneration utilizes a backwash as one of the first steps. To backwash, the flow of water is reversed through the conditioning tank. This removes the sediment which was filtered from the water and eliminates any flow channels that may have developed through the mineral bed during this service cycle.

Thereafter, in a softening installation, the mineral bed is regenerated by a reversal of the "ion exchange." This is accomplished by passing a brine solution through the mineral bed. The sodium ions in the brine solution regenerate the mineral bed and the unwanted ions are flushed to drain. The flushing of the released ions and the excess brine is preferably accomplished by a two-stage rinse. The first, or slow, rinse flushes the brine from the bed substantially to restore the softening capacity of the bed, and the second, or fast, rinse not only assures that any pockets of brine in the bed are completely removed but also washes out any iron which may have been released from the bed by the ion exchange process.

During the time that the regeneration process is accomplished it is desirable that water, even though not filtered or softened, be available in the service lines, and, after regeneration, it is necessary, in softening installations, that a brine solution be prepared for the next regeneration cycle.

Heretofore, human intervention to effect at least certain stages of the aforesaid process, complex motor arrangements to operate valves with close tolerance friction seals, or a combination of complex two or three-way valves and check valves has been required.

The necessity for human intervention is burdensome and is often neglected so that the optimum efficiency of the filtering or softening unit is not realized. Complicated motor arrangements and the close manufacturing tolerance of the valves employed therewith, while more reliable than human intervention, is far too expensive to operate and maintain. While the complex two or three-way valves and check valves have been more satisfactory than either of the other two prior known constructions, the use of check valves in particular is quite bothersome, particularly in that they engender considerable water hammer. Water hammer not only can be heard reverberating noisily throughout the water system, but it also has a particularly deleterious effect on soldered joints, often causing leaks.

Summary of the invention

It is therefore a primary object of the present invention to provide a control capable of effecting a five cycle regeneration process, for water softeners, or, on slight modification, a three cycle filtering process.

It is another object of the present invention to provide a control, as above, which does not interrupt the supply of water to the service lines during the process of regenerating the conditioning tank.

It is still another object of the present invention to provide a control, as above, which is operable upon a small pressure differential across one or more pressure responsive means such as diaphragms.

It is a further object of the present invention to provide a control, as above, wherein the actuating pressure differential is controlled by energization of simple solenoids.

It is a still further object of the present invention to provide a control, as above, by which float controlled valves for controlling the level of the brine in the reservoir are eliminated.

It is an even further object of the present invention to provide a control, as above, which employs a valve which does not require a plurality of close tolerance, smooth surface passages with friction seals and check valves and is, therefore, relatively inexpensive to manufacture and maintain.

These and other objects which will become apparent from the following specification are accomplished by means hereinafter described and claimed.

In general, a control embodying the concept of the present invention directs fluid flow from an inlet port selectively to the top or bottom of a conditioning tank, and from the conditioning tank selectively to an outlet port of a drain.

The control has a housing with an inlet, an outlet and a drain. A double acting inlet poppet valve is movable in the housing between opposed valve seat in an inlet valve chamber which is fed directly from the inlet port. Similarly, a double acting exhaust poppet valve is movable in the housing between opposed valve seats in an outlet valve chamber which connects directly with the outlet port.

A pressure responsive diaphragm for each double acting poppet valve is operable between individual upper and lower actuating chambers to move the respective double acting poppet valves between the opposed valve seats in the corresponding valve chamber. The upper, or first, actuating chamber for each diaphragm selectively communicates, past a valve means, with the outlet valve chamber. The lower, or second, actuating chamber for the diaphragm connected to the double acting exhaust poppet valve is selectively communicable with the outlet valve chamber past one of the opposed valve seats in the outlet valve chamber.

The outlet valve chamber communicates with a distributing chamber past the second of the opposed valve seats in the outlet valve chamber, and the distributing chamber is connected to the bottom of the conditioning tank. The distributing chamber is also selectively communicable with a drain port past a first, normally closed, single acting poppet valve. An actuating diaphragm opens this first single acting poppet valve to drain by pressure from the first actuating chamber for said double acting exhaust poppet valve, said actuating chamber also connected to atmosphere past a restrictive flow means.

The lower, or second, actuating chamber for the diaphragm connected to said double acting inlet poppet valve is continuously connected to the outlet valve chamber and selectively communicable with the inlet valve chamber past one of the opposed valve seats in said inlet valve chamber.

The inlet valve chamber is communicable with a feed chamber past the second of the opposed valve seats in the inlet valve chamber, and the feed chamber is connected to the top of the conditioning tank. The inlet valve chamber is also continuously connected to the lower actuating chamber for the double acting exhaust poppet valve.

The feed chamber is selectively communicable with the drain past a second, normally closed, single acting poppet valve. An actuating diaphragm opens this second single acting poppet valve to drain by pressure from the first actuating chamber for said double acting inlet poppet valve. These actuating chambers too are connected to atmosphere past a restrictive flow means. This second single acting poppet valve is closed by pressure against the diaphragm from the first actuating chamber for said double acting exhaust poppet valve.

A venturi is contained in the housing and fed from the pressure from the inlet valve chamber, through a flow restrictor, so as to draw a concentrated brine from a reservoir. The passage between the reservoir and the venturi contains a two-way, flow control valve which is maintained in closed position by back flow of the line pressure from the feed chamber through the venturi. When the line pressure is reduced in the feed chamber and a partial vacuum is drawn by the venturi, the pressure differential across the valve moves it to its open flow position to drain the reservoir. A floating ball in the reservoir closes the passage when the brine is evacuated. The pressure of subsequent back flow from the feed chamber closes the two-way flow control valve, but a metering aperture in the valve permits a timed reverse flow therethrough to refill the reservoir.

Description of the drawings

FIG. 3A is a partial area of FIG. 3 depicting the diaphragm disc valve in open position;

FIG. 12 is a vertical section through a third portion of the housing body portion taken substantially on line 12—12 of FIG. 9;

FIG. 13 is a vertical cross section taken substantially on line 13—13 of FIG. 3; and, FIG. 14 is an enlarged area of FIG. 1.

Detailed description of the preferred embodiment
Softening cycle

Figure 1:
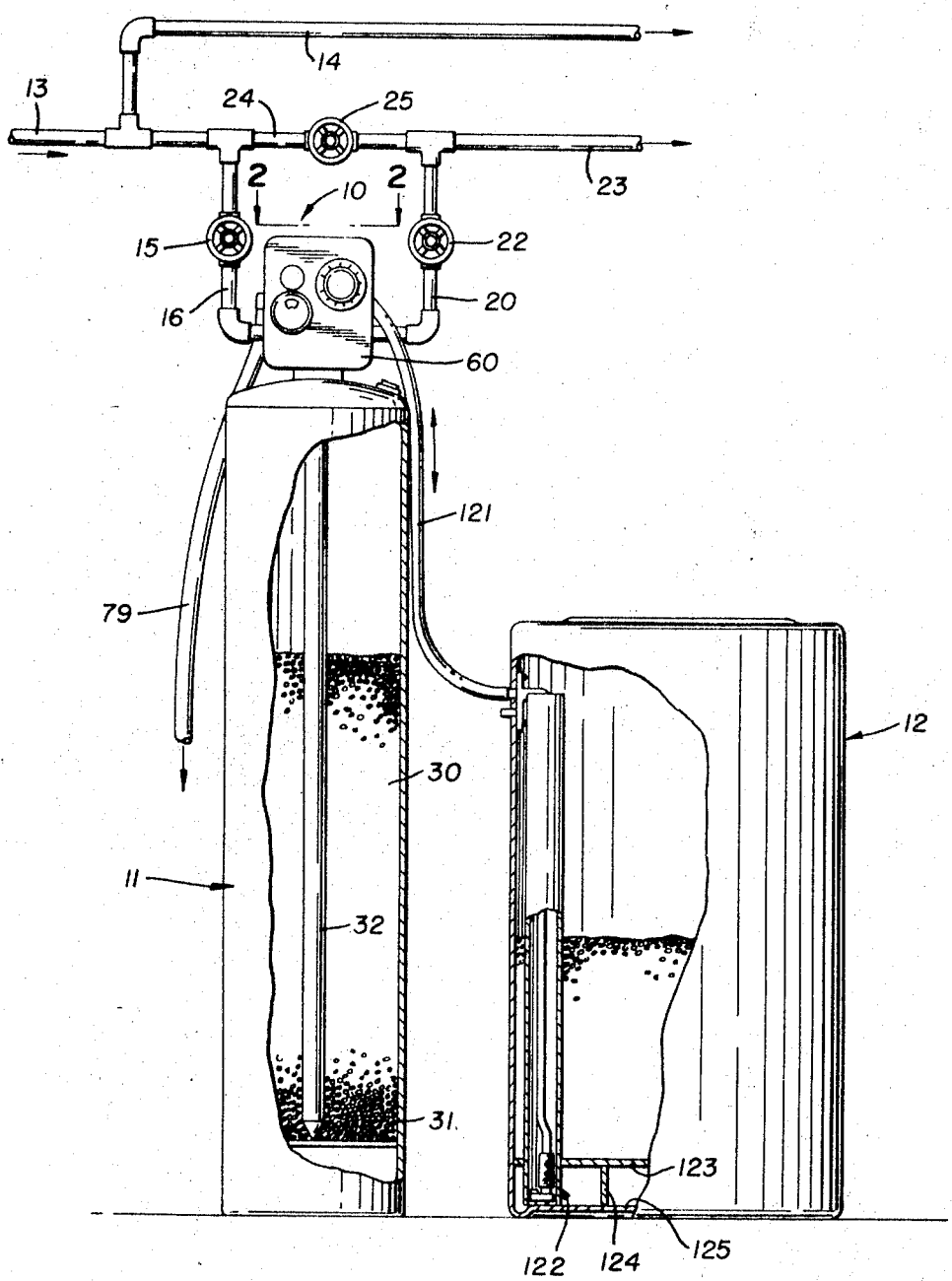
FIG. 1 is a schematic representation, partly broken away and partly in section, of a water softener supplied with a control embodying the concept of the present invention.

A control embodying the concept of the present invention, identified generally by the numeral 10, is attached to a water conditioning tank 11 and brine reservoir 12, as shown in FIG. 1.

In home installations the supply line 13 preferably connects directly to outside faucets which do not require conditioned water by a manifold line 14. The supply line 13 connects, through a shutoff valve 15, to the inlet line 16 which leads to the inlet port 18 (FIG. 3) of the main housing 19 of control 10. An outlet line 20 connects from the outlet port 21 (FIG. 4) in housing 19, through shutoff valve 22, to the service line 23. For emergency supply, a bypass line 24 connect the supply line 13 to the service line 23. A shutoff valve 25 is provided in bypass line 24.

Valve 25 is maintained closed and is only opened should it be necessary to remove the conditioning unit. Correspondingly, the valves 15 and 22 remain open unless the conditioner is to be removed.

In the arrangement of a conditioning tank 11 and a brine reservoir 12, as shown in FIG. 1, the control 10 operates the conditioner as a water softening unit. The control 10 will, therefore, be described in detail as it operates a water softening installation.

In the service, or softening cycle, the hard water flows from supply line 13, through the valve 15 in inlet line 16 and into inlet port 18. From the inlet port 18 (FIG. 3) the hard water flows past a double acting inlet poppet valve 26, the valving portion of which is movable in valve chamber 27, into a hard water feed chamber 28 and out of the housing 19 through an emitting port 29 into the top of the conditioning tank 11.

As the hard water flows down through the softening mineral bed 30 (FIG. 1) and gravel underbedding 31, an "ion exchange" extracts the hardening ions and substitutes them for sodium ions. Thus, the water is softened as it reaches the bottom of the tank where it enters the tube 32 and flows upwardly therein and through the admitting port 33 (FIG. 4) into a soft water distributing chamber 34. From the distributing chamber 34 the soft water flows past a double acting exhaust poppet valve 35, the valving portion of which is movable in outlet valve chamber 36, and through the outlet port 21 and into outlet line 20 from which it flows, through valve 22, into the service line 23.

Figure 3:
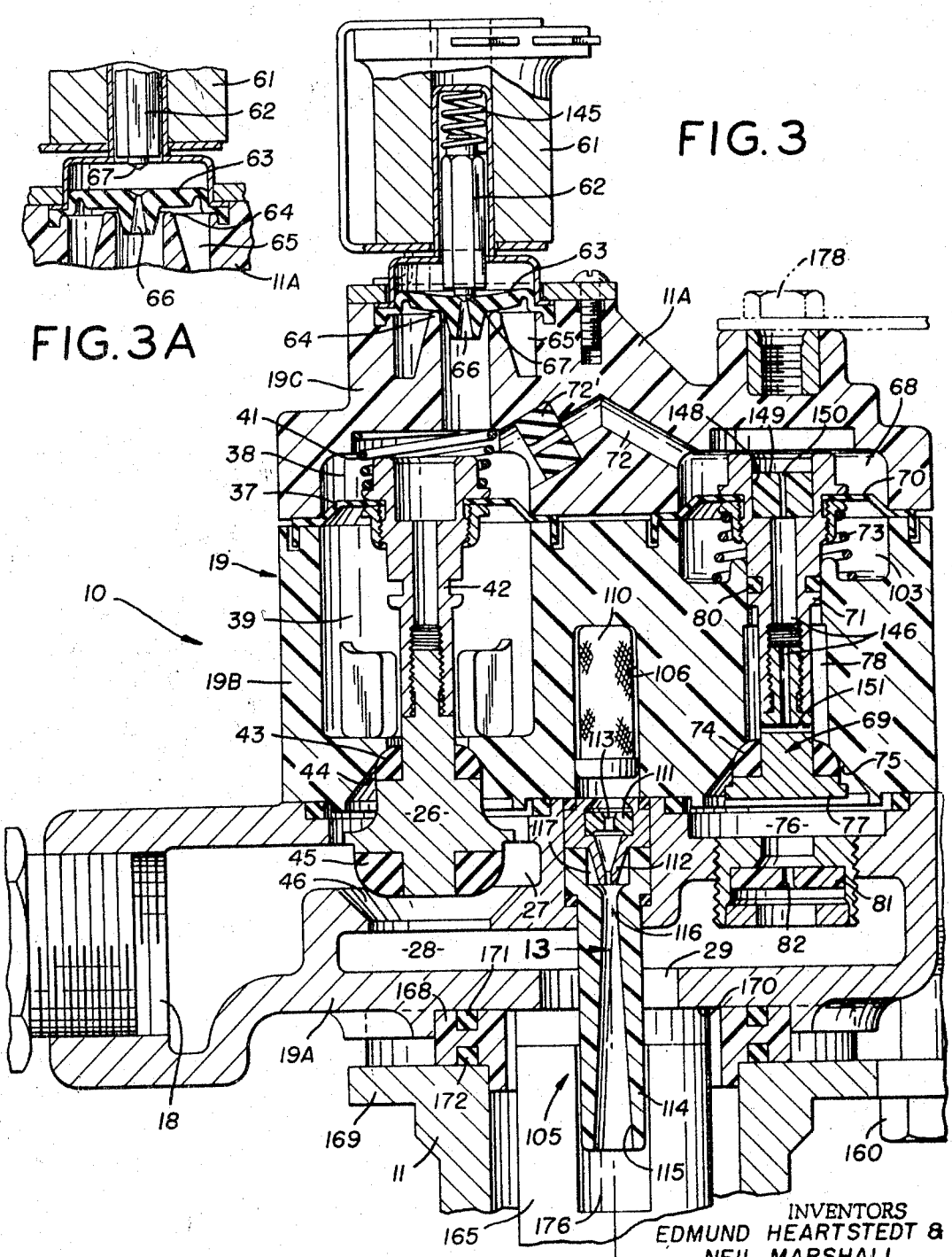
FIG. 3 is a further enlarged vertical cross section taken substantially on line 3—3 of FIG. 2.
Figure 4:
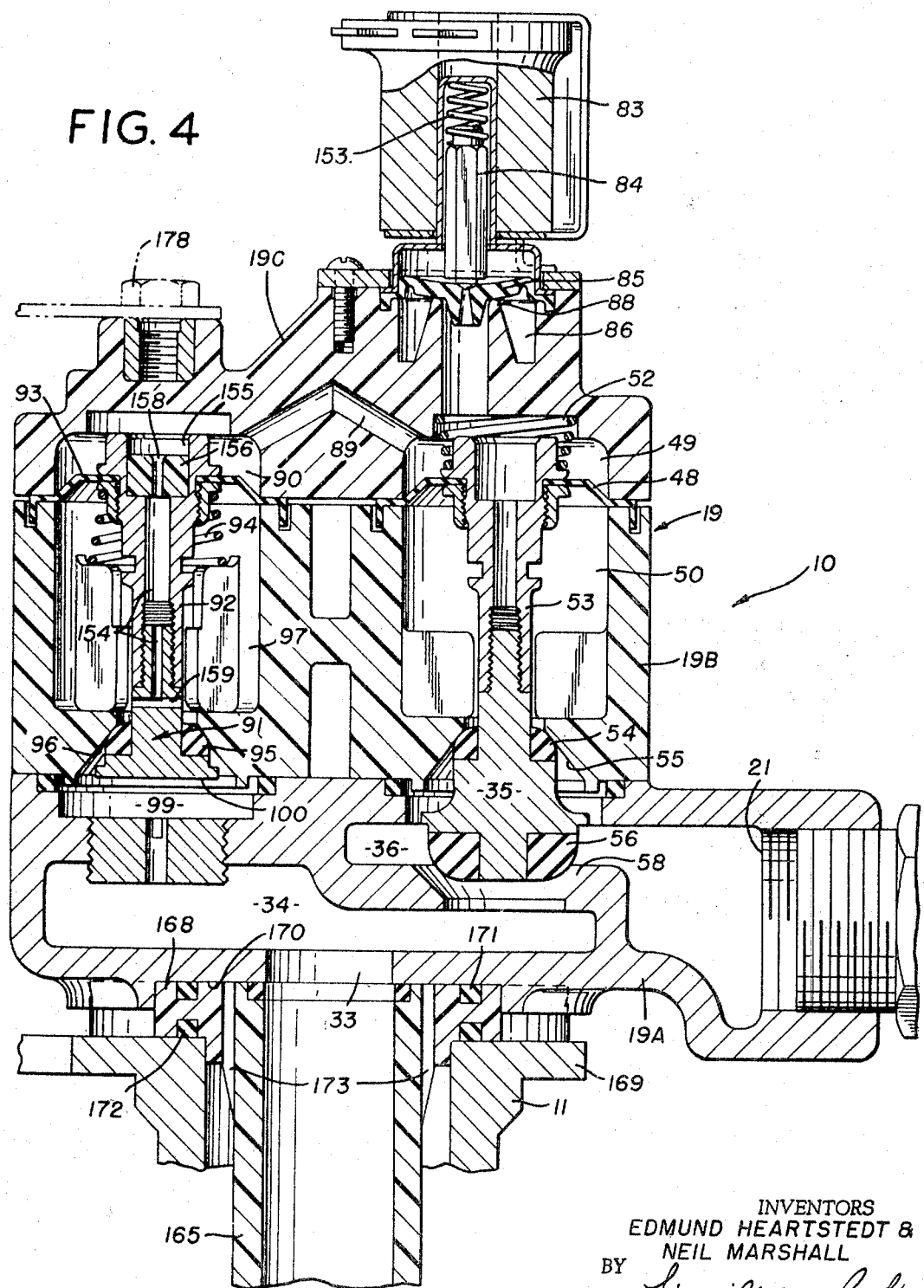
FIG. 4 is a further enlarged vertical cross section taken substantially on line 4—4 of FIG. 2.
Figure 5:
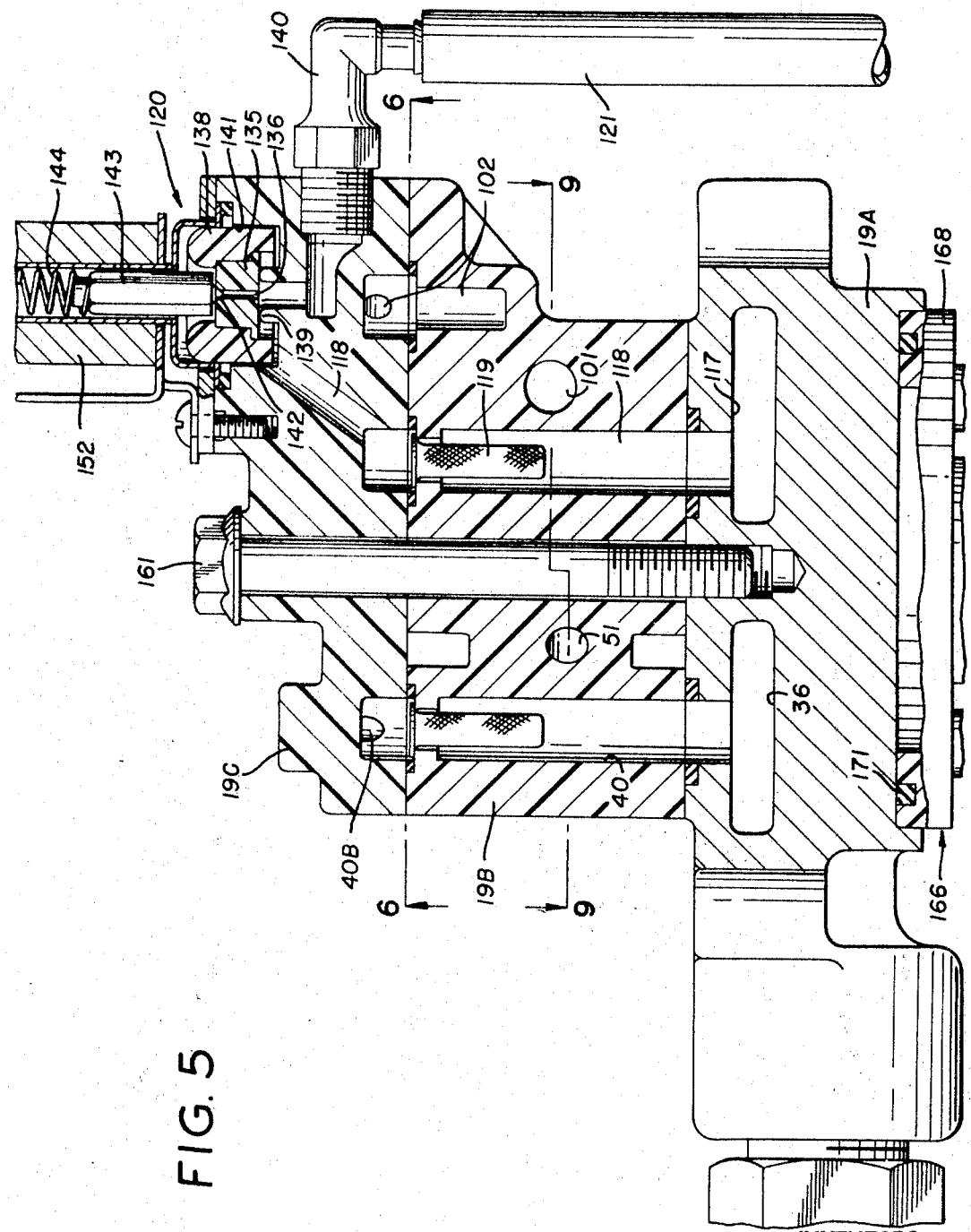
FIG. 5 is also a further enlarged cross section taken substantially on line 5—5 of FIG. 2.
Figure 9:
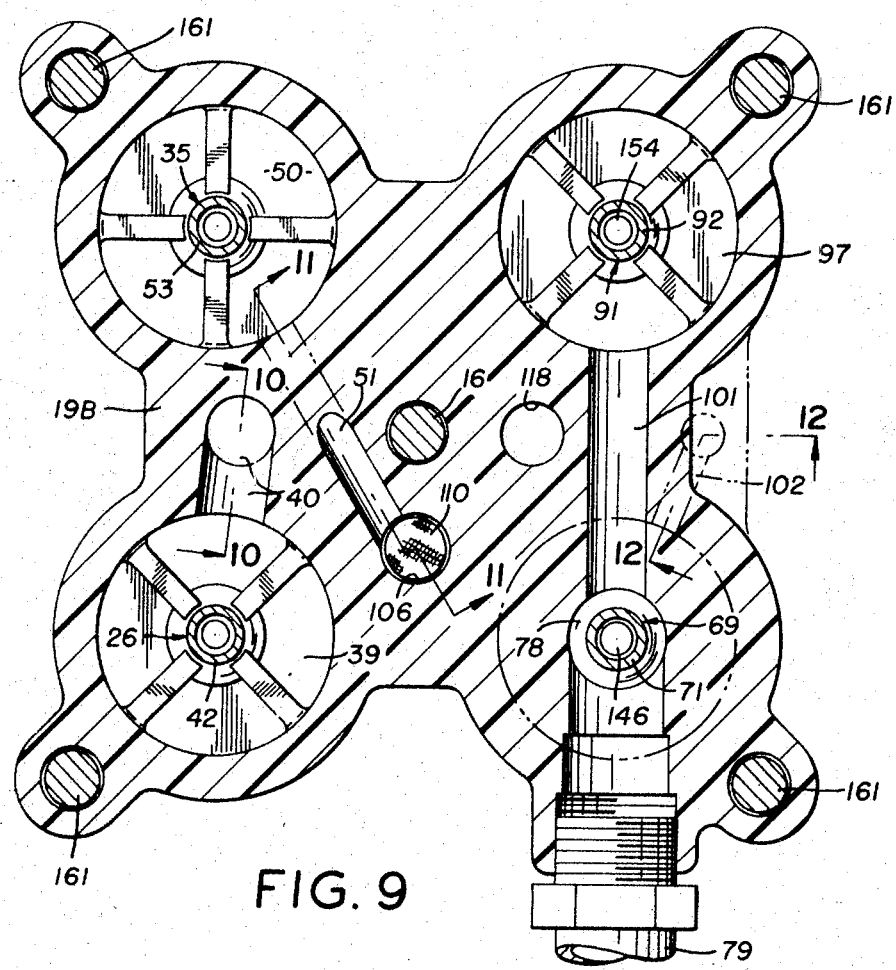
FIG. 9 is a horizontal cross section through the body component of the control housing taken substantially on line 9—9 of FIG. 5.
Figure 10:
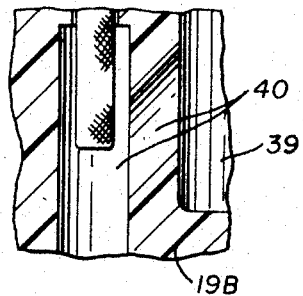
FIG. 10 is a vertical section through a portion of the housing body component taken substantially on line 10—10 of FIG. 9.

As shown in FIGS. 3 and 4 both double acting poppet valves 26 and 35 are in the "up," or service, position. A double acting poppet valve is a two-way valve that changes the direction of flow by changing position. To effect a change of position each poppet valve has an actuating diaphragm. The diaphragm 37 on inlet poppet valve 26 is sealingly secured within the housing 19 to form a first, or upper, actuating chamber 38 and a second, or lower, actuating chamber 39. The upper chamber 38 communicates with atmospheric pressure, as more fully hereinafter described, and the lower chamber 39, communicates with the soft water outlet port 21 through valve chamber 36 by a dog-legged crossover passage 40 (FIGS. 5, 9 and 10). When the upper chamber 38 communicates with atmospheric pressure, the pressure of the water in lower chamber 39 overcomes the downward pressure of the compression spring 41 located in upper chamber 38 and biasingly urges the poppet stem 42 upwardly to maintain the elastomeric first valve element 43 sealingly against valve seat 44 and withdraws the elastomeric second valve element 45 from seat 46 to permit flow of hard water from the inlet port 18 through valve chamber 27 and into the feed chamber 28.

Figure 11:
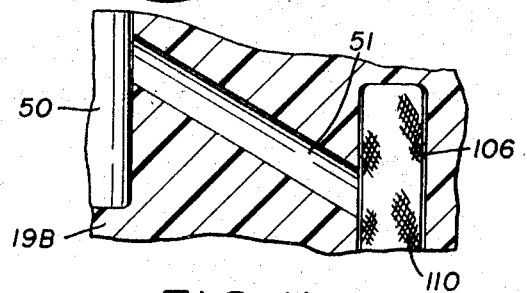
FIG. 11 is a vertical section through a second portion of the housing body component taken substantially on line 11—11 of FIG. 9.

Similarly, the diaphragm 48 (FIG. 4) on poppet valve 35 is sealingly secured within the housing 19 to form a first, or upper, chamber 49 and a second, or lower, chamber 50. The upper chamber 49 independently communicates with atmospheric pressure, as is also more fully hereinafter explained, and the lower chamber 50 communicates with the feed chamber 28 (FIGS. 5, 9 and 11) by a crossover passage 51 as hereinafter described in greater detail with respect to the venturi. When the upper chamber 49 communicates with atmospheric pressure, the pressure of the water in lower chamber 50 overcomes the downward pressure of the compression spring 52 located in the upper chamber 38 and biasingly urges the poppet stem 53 upwardly to maintain the elastomeric first valve element 54 sealed against valve seat 55 and maintains the elastomeric second valve element 56 withdrawn from seat 58 to permit flow of the softened water from the distributing chamber 34 through valve chamber 36 to the outlet port 21.

Backwash cycle

An electrical timer 60 (FIGS. 1 and 2) initiates regeneration, which begins with a backwash cycle. The timer 60 energizes a solenoid 61 (FIGS. 2 and 3) which lifts a plunger 62 upwardly and away from a diaphragm disc valve 63—i.e., from the FIG. 3 to the FIG. 3A position. With the plunger 62 in the down position (FIG. 3), the diaphragm disc valve 63 sealingly engages an annular throat 64 the interior of which communicates with the first, or upper, actuating chamber 38 for diaphragm 37. A pressure chamber 65 concentrically outwardly of the throat 64 communicates with crossover passage 40, via duct 40A, so that upon withdrawal of plunger 62 the pressure of the water from distributing chamber 34, outlet valve chamber 36 and outlet port 21 which reaches the pressure chamber 65 lifts the diaphragm valve 63 (FIG. 3A) and spills over the throat 64 into the upper, or first, actuating chamber 38.

As shown, the diaphragm disc valve 63 is centrally pierced by a relief port 66 which is closed by the tip 67 of plunger 62 when the plunger 62 is in the down position. However, as the plunger 62 moves up, the tip 67 withdraws from port 66. This permits any fluid which may have accumulated above the diaphragm disc valve 63 to be relieved therethrough so as not to deter the operation of the valve 63.

With actuating chamber 38 thus opened to service line pressure there is substantially equal hydraulic pressure on both sides of the actuating diaphragm 37 and the spring 41 urges the poppet 26 downwardly until the second valve member 45 seals against seat 46. With the poppet 26 in the "down," or regenerative, position the hard water from supply line 13 flows between the first valve element 43 and its seat 44 into the lower, or second, actuating chamber 39 and, by crossover passage 40, into the distributing chamber 34 through outlet valve chamber 36 and thence outlet port 21 so that flow to the service line 23 is uninterrupted. At the same time, the hard water flowing through crossover passage 40 into the distributing chamber 34 results in a reversal of the flow direction through tube 32 so that hard water flows upwardly through the underbed 31 and mineral bed 30. During this reverse flow sediment filtered out by the beds 30 and 31 is removed and the beds also tend to expand upwardly, thus removing any flow channels which may have developed during the softening cycle.

The upper, or first, actuating chamber 38 for poppet 26 also communicates with an actuating chamber 68 for a single acting backwash drain poppet valve 69 also contained in housing 19.

A single acting poppet valve is simply a one-way valve which has an "open" and a "closed" position. The single acting poppet valve 69 has an actuating diaphragm 70 connected sealingly between the stem 71 of the single acting poppet valve 69 and the housing 19 to form the actuating chamber 68. The chamber 68 communicates with the actuating chamber 38 for the inlet double acting poppet valve 26 through passage 72 (FIG. 3) and also has restricted communication with the atmosphere, as more fully hereinafter described. A compression spring 73 encircles the stem 71 beneath the actuating diaphragm 70 and biasingly urges an elastomeric valve element 74 on the lower extent of the stem into sealing engagement with a seat 75 in housing 19. The valve element 74 is maintained seated so long as the biasing force of the spring 73 plus any pressure in valve chamber 76 acting against the undersurface 77 of poppet valve 69 exceeds the pressure applied to the actuating diaphragm 70 by the fluid in chamber 68. However, when, as at the beginning of the backwash cycle, the hard water pressure in chamber 38 is transmitted, through passage 72, to chamber 68, the hydraulic pressure on diaphragm 70 exceeds the force of the spring 73 plus the pressure of the hard water in valve chamber 76 acting against undersurface 77, and the valve element 74 is moved downwardly away from its seat 75.

Figure 2:
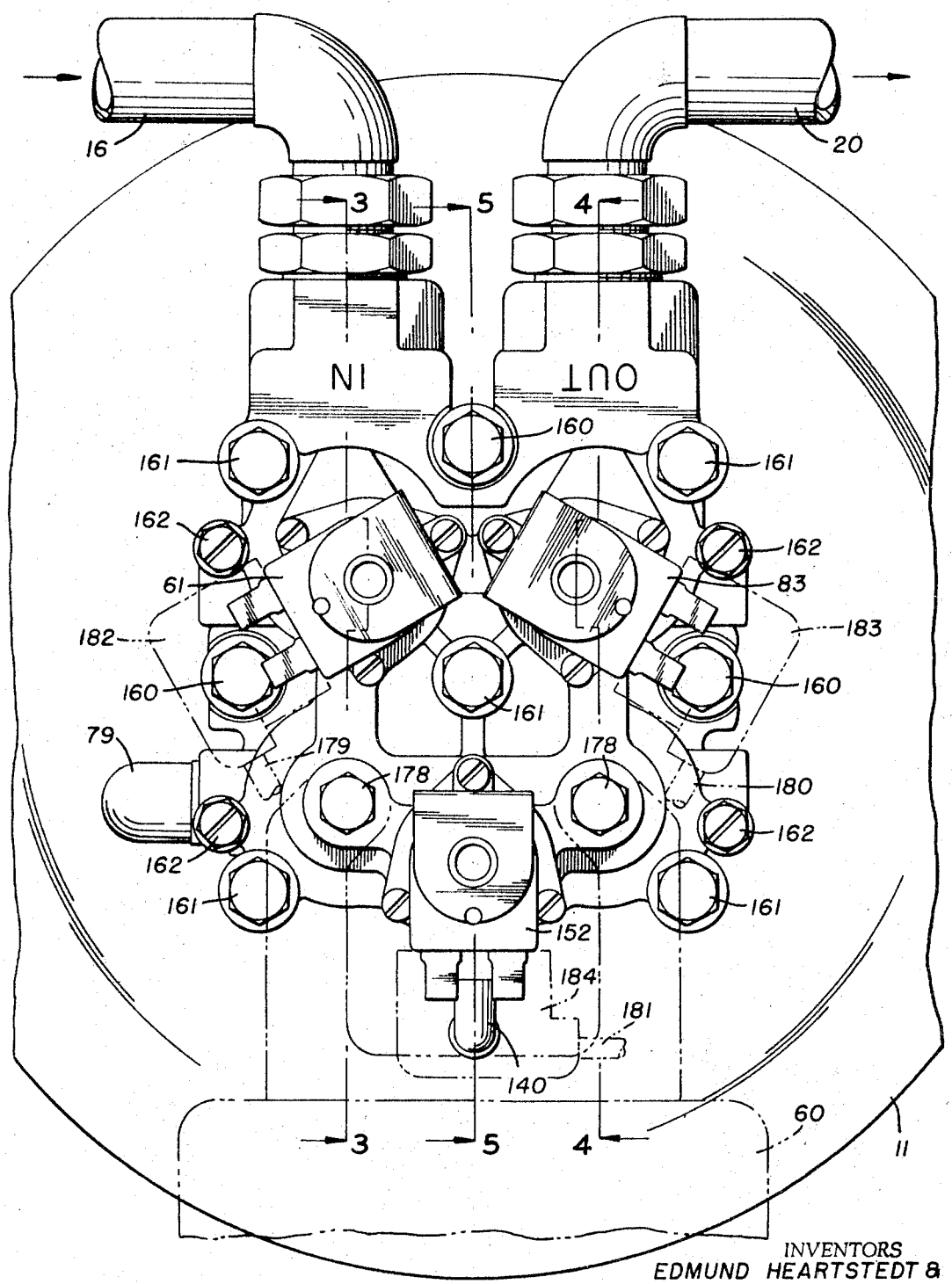
FIG. 2 is an enlarged top plan view of main housing for the subject control taken substantially on line 2—2 of FIG. 1.

The backwash drain chamber 78 through which the stem 71 passes is directly connected to the drain 79 (FIGS. 2 and 9). The drain chamber 78 is sealed from the diaphragm 70 by a low friction sliding seal 80 (FIG. 3) between the stem 71 and the housing 19, but drain chamber 78 is selectively communicable with the hard water feed chamber 28 past valve element 74. A restrictive flow plate 81 with a metering orifice 82 is positioned between the feed chamber 28 and the valve chamber 76 in which the valve element 74 moves. Thus, the rate of flow through the mineral bed 30 is restricted to the optimum amount for expansion of the mineral bed 30 and removal of sediment filtered from the water during the softening cycle. And, inasmuch as the double acting inlet poppet 26 is in the down, or regenerative, position, the inlet port 18 is sealed from the feed chamber 28 so that the backwash water must exit through drain 79.

Brining cycle

After a predetermined period of backwash the timer 60 energizes solenoid 83 (FIGS. 2 and 4) in addition to the previously energized solenoid 61 (FIG. 3). Energization of solenoid 83 similarly lifts a plunger 84 upwardly and away from a diaphragm disc valve 85. A second pressure chamber 86 concentrically outwardly of a throat 88 also communicates with crossover passage 40 via duct 40B (FIGS. 6 and 7) so that upon withdrawal of plunger 84 the pressure of the hard water which replaced the soft water in pressure chamber 86 during the backwash cycle lifts the diaphragm valve 85 and spills over the throat 88 into the upper, or first, actuating chamber 49 for double acting exhaust poppet valve 35.

With the actuating chamber 49 thus opened to supply line pressure there is equal hydraulic pressure on both sides of the actuating diaphragm 48 and the spring 52 urges the exhaust poppet 35 downwardly until the second valve member 56 seals against seat 58.

Even with double acting exhaust poppet valve 35 in the down, or brining, position the hard water continues to flow from the inlet port 18 to the outlet port 21 via crossover passage 40 so that flow to the service line 23 is uninterrupted.

The upper actuating chamber 49 for the double acting exhaust poppet 35 communicates, through passage 89, with a first, or upper, actuating chamber 90 for a second, or brining drain, single acting poppet valve 91. The stem 92 of poppet valve 91 also has an actuating diaphragm 93 connected thereto and sealingly anchored in the housing to form the actuating chamber 90. A compression spring 94 encircles the stem 92 beneath the actuating diaphragm 93 and biasingly urges an elastomeric valve element 95 on the lower extent of the stem into sealing engagement with the seat 96 in housing 19. So long as the force of the spring 94 plus any pressure in valve chamber 99 acting against the undersurface 100 of poppet valve 91 exceeds the hydraulic force applied from chamber 90 against diaphgram 93, the valve element 95 remains sealingly positioned against seat 96.

However, when the solenoid 83 is energized, the hard water pressure transmitted from chamber 49 through passage 89 and into actuating chamber 90 applies a force against diaphragm 93 which exceeds the strength of the spring 94 plus the supply line pressure of the hard water in valve chamber 99 against undersurface 100, and the valve element 95 is moved downwardly and away from its seat 96. In this open, or brine drain position, of single acting poppet valve 91 the soft water distributing chamber 34 communicates, through valve chamber 99 and past valve element 95 into drain chamber 97 which connects with the drain 79 via passage 101 (FIG. 9).

Figure 6:
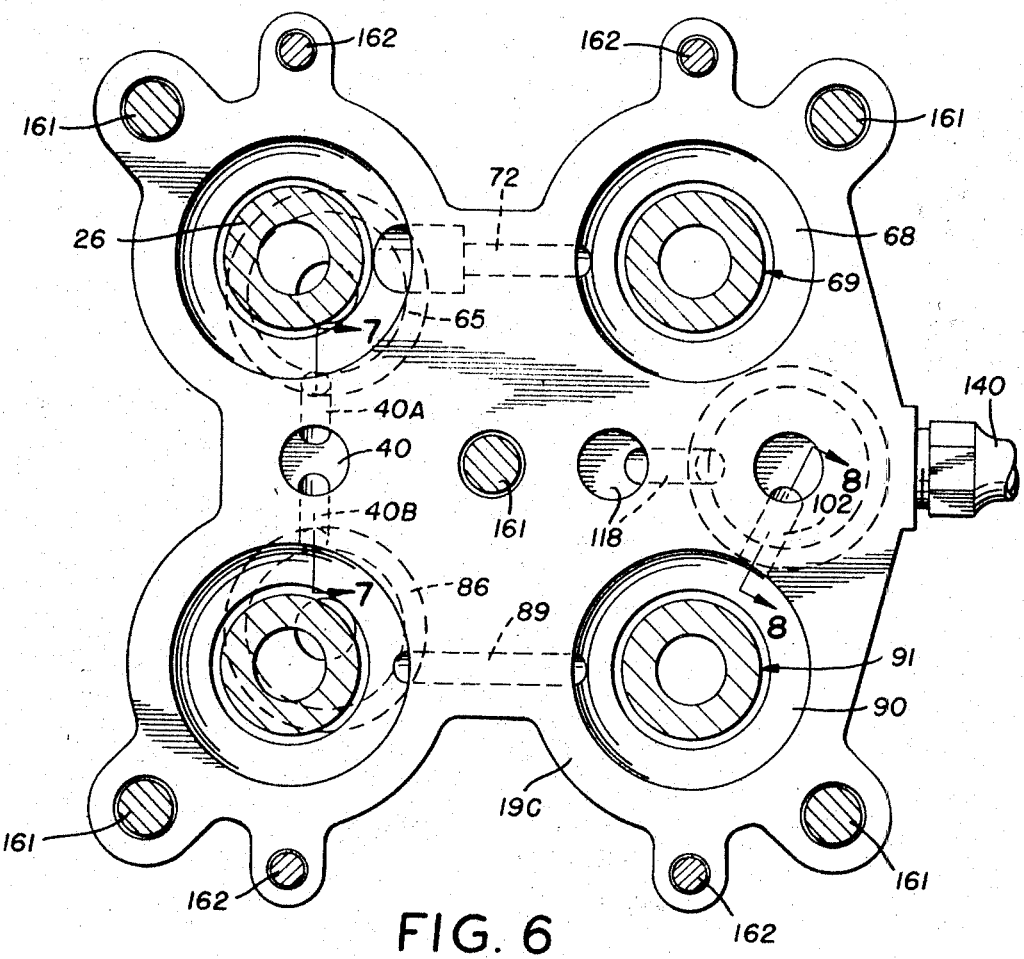
FIG. 6 is a horizontal cross section taken substantially on line 6—6 of FIG. 5 depicting the cap component of the control housing in bottom plan.
Figure 7:
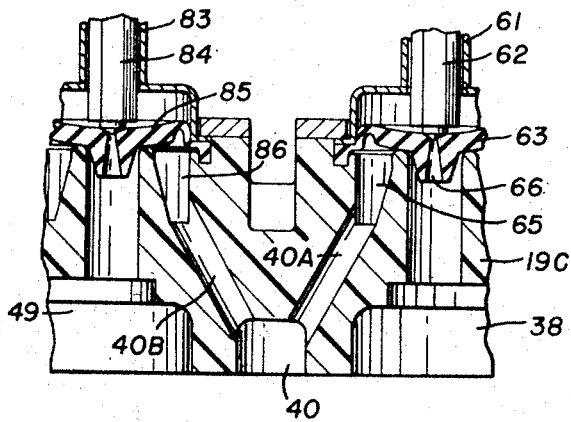
FIG. 7 is a vertical section through a portion of the housing cap component taken substantially on line 7—7 of FIG. 6 and rotated 180°.
Figure 8:
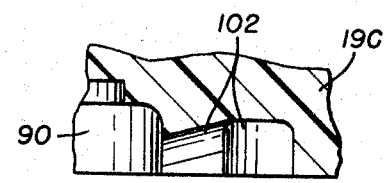
FIG. 8 is also a vertical section through a portion of the housing cap component taken substantially on line 8—8 of FIG. 6 and rotated 180°.

A conduit 102 communicates between actuating chamber 90 for single acting poppet valve 91 (which in turn connects to the upper actuating chamber 49 for double acting inlet popper valve 35) and a second, or lower, actuating chamber 103 for single acting poppet valve 69. Conduit 102 is shown in FIGS. 5, 6, 9 and 12. It will be noted that in FIG. 9 the conduit 102 is shown in chain lines since it is above the section line on which FIG. 6 is taken. Thus, when the solenoid 83 is energized the pressure acting on diaphragm 70 from opposed chambers 68 and 103 together with the pressure afforded by spring 73, the pressure in valve chamber 76 acting upon the undersurface 77 must be sufficient to force the single acting poppet valve 69 to the upper, or closed position, with valve element 74 sealingly engaged against seat 75. These valve closing forces must be sufficient to overcome any other force which might oppose the closing of the valve 69. Therefore, to assure that there is a sufficient pressure acting upon the diaphragm 70 fully to seal the valve element 74 against seat 75, a flow restrictor 72' is preferably inserted within passage 72. In this way the hydraulic pressure in chamber 68 can be maintained less than the hydraulic pressure in chamber 103, and proper closing of valve 69 is assured.

The chamber 103 is sealed from atmosphere, through backwash drain chamber 78, by sliding seal 80.

With the chamber 34 opened to drain 79, as described above, the supply line pressure in conditioning tank 11 as a result of the backwash cycle is quickly reduced to atmospheric pressure. At that time, the venturi system, indicated generally by the numeral 105 in FIG. 3, begins to eject a brine solution into the conditioning tank 11.

The filter chamber 106 (FIG. 3) of the venturi system 105 is connected with the actuating chamber 50 through passage 51 (FIGS. 9 and 11), and, because the double acting exhaust poppet valve 35 is in the down position, the actuating chamber 50 is open to the line pressure from cross-over passage 40 past valve element 54. A screen 110 in filter chamber 106 tends to preclude any plugging or restriction of the venturi by sediment suspended in the hard water. A restrictive flow plate 111 is positioned between the filter chamber 106 and the venturi nozzle 112 and has a metering orifice 113 therethrough to maintain a substantially constant flow rate into the venturi nozzle 112 irrespective of fluctuations in the supply line pressure. An ejector tube 114 is secured to the housing 19 and has a conical passage 115 therethrough which terminates at its uppermost extremity in a throat 116. The throat 116 opens into a brine supply chamber 117 which surrounds the venturi nozzle 112. The brine supply chamber 117 communicates, by passage 118 and through filter 119 (FIG. 5), with one side of a unique two-way flow control valve, indicated generally by the numeral 120. The other side of the flow control valve 120 communicates with the brine reservoir 12, as by tube 121. The tube 121 is connected to a brine draw assembly 122 having an inlet in proximity to the bottom of the brine reservoir 12.

Within the reservoir 12 (FIG. 1) the salt is received on a screen plate 123 which rests on a support 124 disposed above the bottom 125 of the tank 12. The draw assembly 122 (FIGS. 1 and 14) has a housing 126 with a U-shaped passage 128 therethrough terminating at one end with an inlet 129. An extremely fine mesh screen 130 encases the inlet 129 and retains a floating check ball 131 movable vertically of its elastomeric ball seat 132. An air vent 133 extends vertically upwardly from within the screen 130 to above the level of the brine in the reservoir 12. The vent 133 is required inasmuch as the mesh of the screen 130 is so fine that it restricts the flow of air therethrough. Accordingly, the vent 133 provides a ready exit for air within the confines of the screen 130 while the reservoir 12 is being refilled to assure the presence of sufficient liquid within the screen 130 for flotation of the ball 131 and also to prevent premature seating of the ball during the brining cycle.

Returning now to the ejection of brine from the venturi system 105, the flow of water through the venturi nozzle 112 under supply line pressure creates a partial vacuum in the brine supply chamber 117. The atmospheric pressure in reservoir 12 opposing this partial vacuum is thus able to force the concentrated brine solution from reservoir 12 into the inlet 129 beneath the floating ball 131 through the passage 128 and tube 121 to the flow control valve 120 in housing 19 (FIG. 5).

The flow control valve 120 has an elastomeric restrictor disc 135 with a limiting flow aperture 136 therethrough. The disc 135 is mounted in a housing 138 so as to be movable therewith between an upper, or open, and a lower, or seated, position in a lift chamber 141. In the lower position the restrictor disc 135 sealingly engages an annular throat 139 which extends upwardly into lift chamber 141. The interior of throat 139 communicates with tube 121, as through elbow hose barb 140, and the cylindrical lift chamber 141 communicates with passage 118. Hence, with the partial vacuum in passage 118 created by the venturi system 105, and with the aperture 136 blocked by the tip 142 of a metallic plunger 143 the atmospheric pressure within reservoir 12 causes the concentrated brine to lift the disc 135, its housing 138 and plunger 143 upwardly off the throat 139 against the downwardly biasing force of plunger spring 144. With the flow control valve in this "open flow" position the brine pours through the passage 118 and filter 119 to the supply chamber 117 where it mixes, in the conical passage 115 through ejector tube 114, with the hard water emitting from the nozzle 112. The resulting diluted brine flows slowly downwardly through the mineral bed 30, up the pipe 32, through the distributing chamber 34, past the vale element 95 on single acting poppet 91 in valve chamber 99 to drain chamber 97 and out drain 79 via passage 101. The flow of brine through the mineral bed 30 reverses the ion exchange incident to the softening cycle and thus replaces the metallic hardness ions (generally calcium and magnesium) with the sodium ions in the brine.

Slow rinse cycle

When the last of the concentrated brine is removed from the reservoir 12, the floating ball 131 drops onto and sealingly engages the seat 132 to prevent entry of air into the passage 128. Thus, without further change to the energization of the solenoids 61 and 83 water continues to flow from venturi nozzle 112 through tube 114 and into conditioning tank 11. This flow constitutes a slow rinse through the mineral bed 30, up tube 32 and out drain 79 in the same flow pattern previously described in conjunction with the brining cycle.

Fast rinse cycle

After a predetermined period of slow rinse, the timer 60 de-energizes solenoid 61. Upon de-energization of solenoid 61 a spring 145 drives the plunger 62 downwardly against a diaphragm valve 63 forcing it into sealing engagement with the throat 64. The actuating chamber 38 for double acting poppet valve 26 is thus closed to communication with pressure chamber 65. The upper actuating chamber 38 for poppet valve 26 and the upper actuating chamber 68 for single acting backwash drain poppet valve 69, which are joined through passage 72, communicate with atmosphere by a bleed duct 146, the upper portion of which is oriented axially through the stem 71 of the single acting poppet valve 69.

The upper end of the bleed duct 146 opens into a counterbored cavity 148 in the upper extremity of the stem 71 in which a cylindrical flow restrictor 149 is received. However, the flow restrictor 149 must be more restrictive than the restrictor 72′ in passage 72 in order that sufficient pressure will be available in chamber 68 to allow the single acting poppet 69 properly to open. It must be further appreciated that this relative restriction afforded by restrictors 72′ and 149 cooperates to maintain the desired pressure differential between chambers 68 and 103. The flow restrictor 149 is preferably made of a relatively thick elastomeric material with an axial channel 150 therethrough which is aligned with duct 146. The thickness and durometer of the restrictor 149 are such that as the pressure increases within the chamber 68 the channel 150 is constricted to permit only a minimal flow therethrough. Hence, so long as the chambers 38 and 68 are subjected to line pressure, only a very nominal amount of water bleeds through channel 150.

The lower end of the axial bleed duct 146 intersects a radial leg 151 which drains into the drain chamber 78.

Thus, after the diaphragm valve 63 closes, the actuating chambers 38 and 68 empty through the restrictor 149 and duct 146 into drain chamber 78 and out drain 79. This does not change the position of single acting poppet 69, but as the pressure in chamber 38 is reduced, the pressure against the diaphragm 37 from the second, or lower, actuating chamber 39 overcomes the downward pressure of the compression spring 41 and the double acting inlet poppet 26 is moved to the up, or service position, with the first valve element 43 sealed against seat 44, as shown in FIG. 3.

Water under supply line pressure now flows from the inlet port 18, through the valve chamber 27, past valve element 45 and into the hard water feed chamber 28. From the feed chamber 28 the hard water passes into the conditioning tank 11 from which it washes any remaining brine, iron and other loose sediment not already removed up the tube 32 and out drain 79 in the same flow pattern described in conjunction with the exiting flow during the brining cycle and the slow rinse cycle.

At the same time, the line pressure of the hard water entering the tank 11 through feed chamber 28 causes water to back flow into the ejector tube 114 and from there fill the brine supply chamber 117 and passage 118. At the conclusion of the brining cycle the spring 144 forced the plunger 143, the restrictor disc 135 and float housing 138 downwardly until the disc 135 sealed against throat 139. The back flow of hard water up passage 119 cannot pass beyond the valve 120 inasmuch as the tip 142 of plunger 143 blocks the aperture 136 in the restrictor disc 135 and further because the water in the lift chamber 141 tends to assist the plunger 143 in holding the disc 135 seated on throat 139.

All during the fast rinse cycle an uninterrupted hard water supply is maintained available to the house service via the crossover passage 51. That is, the hard water at inlet 18 passes from the feed chamber 28 into the top of the tank and back flows through the venturi 105, along passage 51 and into the second, or lower, actuating chamber 50 for double acting exhaust poppet valve 35. With the poppet valve 35 in the down, or brining, position, the actuating chamber 50 communicates, past valve element 54, with the valve chamber 36 and thence outlet port 21.

Softening-brine refill cycle

After a predetermined period of fast rinse, the timer 60 de-energizes solenoid 83 and energizes a third solenoid 152.

Upon de-energization of solenoid 83 a spring 153 drives the plunger 84 downwardly against diaphragm disc valve 85 forcing it into sealing engagement with throat 88. The upper actuating chamber 49 for double acting exhaust poppet valve 35 is thus closed to communication with pressure chamber 86. The upper actuating chamber 49 for poppet valve 35 and the upper actuating chamber 90 for single acting brining drain poppet valve 91, which are joined, through passage 89, also communicate by a bleed duct 154, the upper portion of which is oriented axially through the stem 92 of the single acting poppet valve 91.

The upper end of the duct 154 opens into a counterbored cavity 155 at the upper extremity of the stem 92 into which a cylindrical flow restrictor 156, identical with flow restrictor 149, is received. The channel 158 through restrictor 156 aligns with the duct 154, and the lower end of the axial duct 154 intersects a radial leg 159 which drains into the drain chamber 97 beneath diaphragm 93.

Accordingly, when the solenoid 83 is de-energized the chambers 49 and 90 empty through restrictor channel 158, duct 154, chamber 97 and out drain 79 via passage 101. At the same time, the lower actuating chamber 103 for the backwash drain single acting poppet 68 is drained since it communicates with the chamber 90 by conduit 102.

The control 10 has thus returned to the softening cycle, but in addition thereto, the energization of solenoid 152 lifts plunger 143 against the downward biasing action of spring 144. The line pressure in lift chamber 141 maintains the restrictor disc 135 sealed against throat 139 and as the tip 142 of plunger 143 is extracted from the aperture 136 a metered flow of water from lift chamber 141 passes therethrough. The water travels down tube 121 and into the reservoir 12 past ball 131. As the level of the water rises in reservoir 12, the vent 133 prevents air from being entrapped within screen 130 and a quantity of the salt on screen plate 123 goes into solution.

The timer 60 is set to de-energize the solenoid 152 after a predetermined period of time. Upon de-energization of solenoid 152 the spring 144 forces the plunger 143 downwardly until the tip 142 seats in aperture 136. This causes a cessation of the flow through control valve 120. Thus, with a metered flow over a controlled period of time a selected volume of water is admitted into reservoir 12. That portion of the salt contained in the reservoir 12 which can be is dissolved in the water until the solution is saturated. This saturated solution constitutes the concentrated brine which will be used to re-generate the mineral bed 30 during the next periodic brining cycle.

Serviceability

Referring generally to FIGS. 3, 4 and 5 it will be observed that the housing 19 is comprised of three distinct components. The base component 19A is preferably metallic and is rigidly secured to the tank 11, as by a plurality of anchor bolts 160. The inlet line 16 and the outlet line 20 are coupled to the base component 19A. Within the base component 19A are the hard water feed chamber 28, the soft water distributing chamber 34 and a portion of the four valve chambers for the two double acting poppet valves 26 and 35 and the two single acting poppet valves 69 and 91.

The body component 19B and the cap component 19C are commonly joined to the base component 19A by five body bolts 161 which tighten into the base component 19A. In addition, it is desirable to secure the cap component 19C and the body component 19B by the four tacking bolts 162. The bolts 162 are provided merely to maintain the body and cap components together when the combined assembly is removed from the base component 19A.

Separation of the control 10 into these components makes the complete innards thereof available for inspection, cleaning and replacement without the necessity of uncoupling the plumbing connections or disturbing the mineral bed 30 by withdrawal of tube 32. Similarly, the assembly is greatly facilitated by not being required to reinsert the tube 32 into the mineral bed. And, if necessary, even the base component 19A may be removed from the conditioning tank without disturbing the tube 32. The tube 32 is received in the hollow stem 165 of a spider adapter 166. The annular rim 168 of the spider adapter 166 received between the cap flange 169 of the conditioning tank 11 and the recessed compression surface 170 on the underside of the housing base component 19A. As shown particularly well in FIGS. 3, 4 and 13, a pair of opposed O-rings 171 and 172 seal the annular rim 168 respectively to the base component 19A and the cap flange 169. The emitting port 29 communicated with the top of the conditioning tank 11 past the radial supporting ribs 173 which connect between the annular rim 168 and the stem 165.

The interior passage 174 of the hollow stem 165 communicates between the tube 32 and the admitting port 33 with a third O-ring 175 sealing the upper extent of passage 174 to the base component 19A around the admitting port 33. The venturi tube 114, which extends downwardly through the emitting port 29, lies in a recess 176 provided in the exterior surface of the stem 165. The extension of the venturi tube 114 below the base component 19B also cooperates, as it is received in recess 176, to index the parts as they are reassembled.

Hence, removal of the base component 19A from the conditioning tank 11 will not disturb the tube 32.

Also for ease of service the timer 60 may be mounted to the housing 19 by a plurality of small cap screws 178 with the electrical connection between the timer 60 and the three solenoids 61, 83 and 152 being accomplished by cords 179, 180 and 181, respectively, having quick connect plugs 182, 183 and 184.

Adaptability as a three cycle filter control

For some installations it may not be necessary to soften the water, but only filter it. Such occasions present themselves when the water does not contain the metallic hardness ions but yet may have sediment, turbidity, taste or odor which can be removed through a filter bed.

The heretofore described five cycle water softener control can be readily adapted to effect the desired three cycle control simply by removing the venturi system 105 and its related flow control valve 120. This, in turn, eliminates the need for the third solenoid 152 and the brine reservoir 112 and its related conduits. All other connections remain the same, and the control is operated by only the two solenoids 61 and 83.

To filter, both solenoids remain de-energized and the flow through the tank 11, which would have an appropriate filter bed substitute for the mineral bed 30, is accomplished identically as described in conjunction with the softening cycle described above.

After a predetermined period of filtering it is desirable to clean the filter bed. This is accomplished by energization of solenoid 61 which initiates a backwash cycle identical with the backwash cycle described above. The backwash is a reversal of the flow through the filter bed which flushes the sediment therefrom and eliminates any deleterious flow channels which may have formed through the filter bed.

Following the backwash cycle the second solenoid 83 is energized to initiate a rinse cycle. This cycle is comparable to the flow through the control 10 as described in conjunction with the slow rinse described above, except that there is no venturi system 105 and the water flows out at the filter chamber 106 and into the conditioning tank 11.

After rinsing, the solenoids 61 and 83 are both de-energized and the filtering cycle is renewed.

It should thus be apparent that a device embodying the concept of the present invention provides a dependable control which is readily adaptable for operating either a three cycle filter or a five cycle water softening installatioin without expensive valving or motors and noisy check valves and otherwise accomplishes the objects of the invention.

We claim:

1. A control for directing fluid flow from a supply inlet selectively to the top or bottom of a conditioning tank and selectively from said conditioning tank to a service outlet or drain, said control having a housing with an inlet port, an outlet port and a drain, said housing also having a feed chamber communicating with the top of a conditioning tank and a distributing chamber communicating with the bottom of a conditioning tank, two double acting poppet valves operative in said housing, two single acting poppet valves operative in said housing, one of said double acting poppet valves movable between a first and second position selectively to direct the fluid from said inlet port to said feed chamber or said outlet port, the other of said double acting poppet valves movable between a first and second position selectively to direct the fluid from said distributing chamber to said outlet port or from said distributing chamber to the first of said single acting poppet valves, pressure responsive means for each of said double acting poppet valves for selectively moving each said double acting poppet valve between its first and second position, the first of said single acting poppet valves movable from a closed to an open position to permit selective communication between said distributing chamber and said drain, and the other of said single acting poppet valves movable between a closed and an open position to provide selective communication between said feed chamber and said drain, and pressure responsive means for moving each of said single acting poppet valves between said closed and open positions.

2. A control, as set forth in claim 1, in which the fluid at the inlet and outlet port is at substantially line pressure and in which the pressure responsive means for each double acting poppet valve comprises an actuating diaphragm secured between its respective double acting poppet valve and the housing to form opposed actuating chambers, one on either side of said diaphragm, the first of said actuating chambers communicating with line pressure past a selectively operative valve means, the second of said actuating chambers continuously communicable with line pressure, and biasing means of lesser magnitude than the force acting on said diaphragm from said second actuating chamber urging said double acting poppet valve in a direction identical with the direction said double acting poppet valve is urged by line pressure in said first actuating chamber.

3. A control, as set forth in claim 2, in which the valve means is a diaphragm disc valve movable into and out of engagement with a throat, the interior of said throat communicates with said first actuating chamber, pressure chamber exteriorly of said throat opens annularly against said diaphragm disc valve, said pressure chamber communicates continuously with line pressure, plunger means maintain said diaphragm valve seatingly engaged with said throat, and means are provided selectively to withdraw said plunger.

4. A control, as set forth in claim 3, in which spring means continuously bias said single acting poppet valves to their closed position and in which a diaphragm is attached to each said single action poppet valve, a first actuating chamber is provided on one side of each said diaphragm, passage means conduct the pressure from the first actuating chamber for one of said double acting poppet valves to the first actuating chamber for one of said single acting poppet valves to open said single acting poppet valve.

5. A control, as set forth in claim 4, in which the first actuating chamber for each said single acting poppet valve is connected to atmosphere through a bleed duct, flow restrictor means being incorporated in each said bleed duct.

6. A control, as set forth in claim 5, in which the upper end of the bleed duct terminates in a counterbored cylindrical cavity opening into the first actuating chamber for said single acting poppet valve, and the flow restrictor is a cylindrical elastomeric plug received in said cavity with a flow channel axially therethrough, the axial extent of said plug and the durometer of the elastomeric material from which it is made being such that said flow channel constricts to permit only minimal fluid flow therethrough upon the application of fluid pressure against said plug from the first actuating chamber for said single acting poppet valve.

7. A control, as set forth in claim 5, in which a second actuating chamber opposes the first actuating chamber across the diaphragm operating one of said single acting poppet valves, the first actuating chamber for said single acting poppet valve being connected to the first actuating chamber for the double acting poppet valve which directs flow from said inlet port to said feed chamber, the second actuating chamber for said single acting poppet valve connected to the first actuating chamber for the double acting poppet valve which directs flow from said distributing chamber to said outlet port.

8. A control, as set forth in claim 7, in which one of said double acting poppet valves is an inlet poppet valve movable between opposed valve seats in an inlet valve chamber and the second of said double acting poppet valves is an exhaust poppet valve movable between opposed valve seats in an outlet valve chamber, the second actuating chamber for said exhaust poppet valve being selectively communicable with said outlet valve chamber past one of said opposed valve seats therein, said distributing chamber also being selectively communicable with said outlet valve chamber past the second of said opposed seats therein, the second actuating chamber for said inlet poppet valve continuously connected to said outlet valve chamber and selectively communicable with said inlet valve chamber past one of the opposed valve seats therein, said feed chamber selectively communicable with said inlet valve chamber past the second of said opposed valve seats therein.

9. A control, as set forth in claim 1, in which brine is selectively admissible to said conditioning tank by a venturi means from a brine reservoir through passage means connecting said reservoir to said venturi means, a two-way flow control valve in said passage means, said flow control valve comprising, a disc means movable between an open flow and a seated position in a lift chamber, an annular throat in said lift chamber, the interior of said throat communicating with the brine reservoir through a portion of said passage means, said lift chamber communicating with said venturi means through the remainder of said passage means, said disc means sealingly received against said throat in said seated position and said disc means displaced from said throat in the open flow position.

10. A control, as set forth in claim 9, in which an air check valve is contained in that portion of said passage means connecting between said brine reservoir and said two-way flow control valve to close said passage means to flow from said reservoir upon evacuation of the brine therefrom and in which a limiting flow aperture is provided through said disc means to provide communication between said lift chamber and the interior of said throat, plunger means movable into and out of blocking engagement with said limiting flow aperture, and means selectively to move said plunger into and out of engagement with said limiting flow aperture to permit metered reverse flow from said lift chamber to said reservoir for filling said brine reservoir with water.

11. A control, as set forth in claim 10, in which the fluid at the inlet and outlet port is at substantially line pressure and in which the pressure responsive means for each double acting poppet valve comprises an actuating diaphragm secured between its respective double acting poppet valve and the housing to form opposed actuating chambers, one on either side of said diaphragm, the first of said actuating chambers communicating with line pressure past a selectively operative valve means, the second of said actuating chambers continuously communicable with line pressure, and biasing means of lesser magnitude than the force acting on said diaphragm from said second actuating chamber urging said double acting poppet valve in a direction identical with the direction said double acting poppet valve is urged by line pressure in said first actuating chamber.

12. A control, as set forth in claim 11, in which the valve means is a diaphragm disc valve movable into and out of engagement with a throat, the interior of said throat communicates with said first actuating chamber, pressure chamber exteriorly of said throat opens annularly against said diaphragm disc valve, said pressure chamber communicates continuously with line pressure, plunger means maintain said diaphragm valve seatingly engaged with said throat, and means are provided selectively to withdraw said plunger.

13. A control, as set forth in claim 12, in which spring means continuously bias said single acting poppet valves to their closed position and in which a diaphragm is attached to each said single action poppet valve, a first actuating chamber is provided on one side of each said diaphragm, passage means conduct the pressure from the first actuating chamber for one of said double acting poppet valves to the first actuating chamber for one of said single acting poppet valves to open said single acting poppet valve.

14. A control, as set forth in claim 13, in which the first actuating chamber for each said single acting poppet valve is connected to atmosphere through a bleed duct, flow restrictor means being incorporated in each said bleed duct.

15. A control, as set forth in claim 14, in which the upper end of the bleed duct terminates in a counterbored cylindrical cavity opening into the first actuating chamber for said single acting poppet valve, and the flow restrictor is a cylindrical elastomeric plug received in said cavity with a flow channel axially therethrough, the axial extent of said plug and the durometer of the elastomeric material from which it is made being such that said flow channel constricts to permit only minimal fluid flow therethrough upon the application of fluid pressure against said plug from the first actuating chamber for said single acting poppet valve.

16. A control, as set forth in claim 14, in which a second actuating chamber opposes the first actuating chamber across the diaphragm operating one of said single acting poppet valves, the first actuating chamber for said single acting poppet valve being connected to the first actuating chamber for the double acting poppet valve which directs flow from said inlet port to said feed chamber, the second actuating chamber for said single acting poppet valve connected to the first actuating chamber for the double acting poppet valve which directs flow from said distributing chamber to said outlet port.

17. A control, as set forth in claim 16, in which one of said double acting poppet valves is an inlet poppet valve movable between opposed valve seats in an inlet valve chamber and the second of said double acting poppet valves is an exhaust poppet valve movable between opposed valve seats in an outlet valve chamber, the second actuating chamber for said exhaust poppet valve being selectively communicable with said outlet valve chamber past one of said opposed valve seats therein, said distributing chamber also being selectively communicable with said outlet valve chamber past the second of said opposed seats therein, the second actuating chamber for said inlet poppet valve continuously connected to said outlet valve chamber and selectively communicable with said inlet valve chamber past one of the opposed valve seats therein, said feed chamber selectively communicable with said inlet valve chamber past the second of said opposed valve seats therein.

18. A control for directing fluid flow from a supply inlet selectively to the top or bottom of a conditioning tank and selectively from said conditioning tank to a service outlet or drain, said control having a housing with an inlet port and an outlet port, said housing also having a feed chamber communicating with the top of said conditioning tank and a distributing chamber communicating with the bottom of said conditioning tank, an inlet double acting poppet valve movable in said housing between opposed valve seats in an inlet valve chamber, an exhaust double acting poppet valve movable in said housing between opposed valve seats in an outlet valve chamber, said exhaust double acting poppet valve having an actuating diaphragm operable between an upper and a lower actuating chamber, a first valve means for providing selective communication between the upper actuating chamber for said double acting exhaust poppet valve and said outlet valve chamber, the lower actuating chamber for said double acting exhaust poppet valve selectively communicable with said outlet valve chamber past one of said opposed valve seats in said outlet valve chamber, said distributing chamber selectively communicable with said outlet valve chamber past the second of said opposed valve seats in said outlet valve chamber, a drain, said distributing chamber selectively communicable with said drain past a first normally closed, single acting poppet valve, an actuating diaphragm for opening said first single acting poppet valve by pressure communicable from the upper actuating chamber for said double acting exhaust poppet valve, restricted flow means connecting said upper actuating chamber for said double acting exhaust poppet valve to atmosphere, said feed chamber connected to the lower actuating chamber for said double acting exhaust poppet valve, said double acting inlet poppet valve having an actuating diaphragm operable between an upper and a lower actuating chamber, a second valve means for providing selective communication between the upper actuating chamber for said double acting inlet poppet valve and said outlet valve chamber, the lower acting chamber for said double acting inlet poppet valve continuously connected to said outlet valve chamber and selectively communicable with said inlet valve chamber past one of said opposed valve seats in said inlet valve chamber, said feed chamber selectively communicable with said inlet valve chamber past the second of said opposed said valve seats in said inlet chamber, said feed chamber selectively communicable with said drain past a second, normally closed, single acting poppet valve, an actuating diaphragm for said second single acting poppet valve operable between an upper and lower actuating chamber, the upper actuating chamber for said second single acting poppet valve communicating with the upper actuating chamber for said double acting inlet poppet valve and the lower actuating chamber for said second single acting poppet valve communicating with the upper actuating chamber for the double acting exhaust poppet valve, and restricted flow means connecting said upper actuating chamber for said second single acting poppet valve to atmosphere.

19. A control, as set forth in claim 18, in which brine is selectively admissible to said conditioning tank by a venturi means from a brine reservoir through passage means connecting said reservoir to said venturi means, a two-way flow control valve in said passage means, said flow control valve comprising, a disc means movable between an open flow and a seated position in a lift chamber, an annular throat in said lift chamber, the interior of said throat communicating with the brine reservoir through a portion of said passage means, said lift chamber communicating with said venturi means through the remainder of said passage means, said disc means sealingly received against said throat in said seated position and said disc means displaced from said throat in the open flow position.

20. A control, as set forth in claim 19, in which an air check valve is contained in that portion of said passage means connecting between said brine reservoir and said two-way flow control valve to close said passage means to flow from said reservoir upon evacuation of the brine therefrom and in which a limiting flow aperture is provided through said disc means to provide communication between said lift chamber and the interior of said throat, plunger means movable into and out of blocking engagement with said limiting flow aperture, and means selectively to move said plunger into and out of engagement with said limiting flow aperture to permit metered reverse flow from said lift chamber to said reservoir for filling said brine reservoir with water.

References Cited
UNITED STATES PATENTS

| | | | |
|---|---|---|---|
| 3,181,564 | 5/1965 | Rudelick | 137—599.1 |
| 3,348,574 | 10/1967 | Brane | 137—599.1 |
| 3,354,907 | 11/1967 | Kryzer et al. | 137—599.1 |

FOREIGN PATENTS

| | | |
|---|---|---|
| 674,389 | 11/1963 | Canada. |

WILLIAM F. O'DEA, Primary Examiner

DENNIS H. LAMBERT, Assistant Examiner

U.S. Cl. X.R.

137—599; 210—190